No. 658,836. Patented Oct. 2, 1900.
P. R. DUNCAN.
MECHANISM FOR MANUFACTURING RIVETS.
(Application filed May 11, 1900.)
(No Model.) 2 Sheets—Sheet 1.
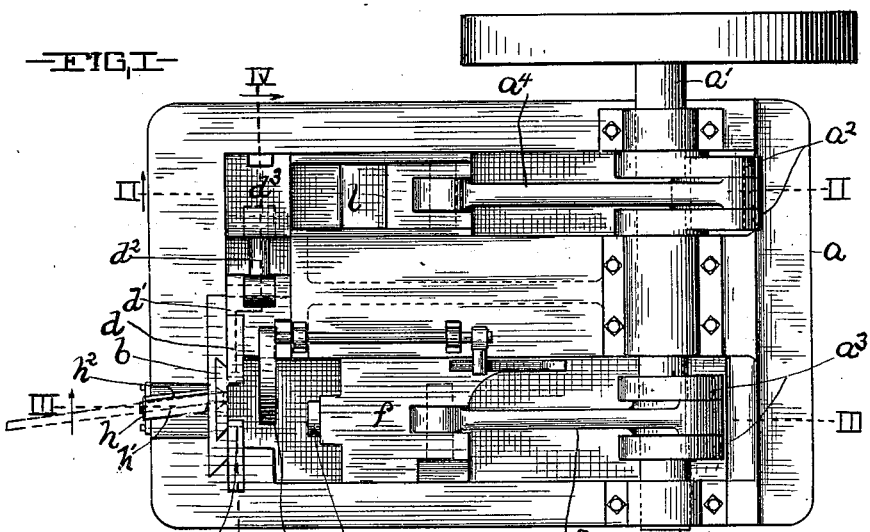
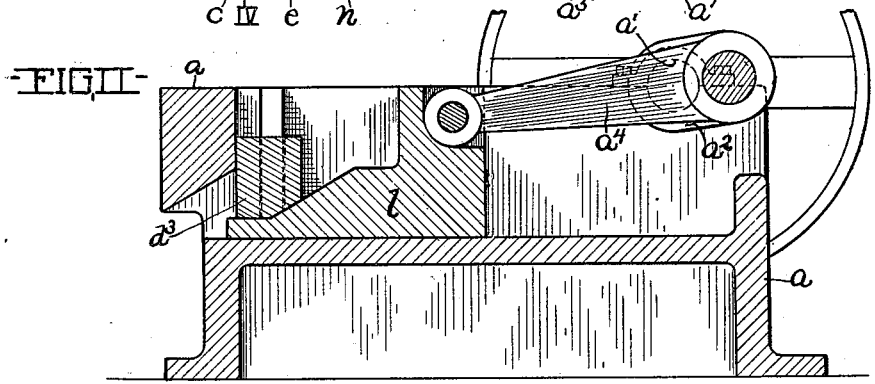
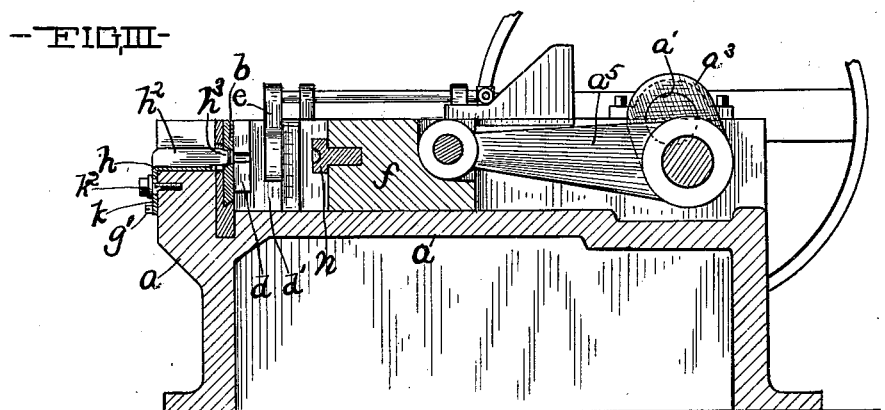
WITNESSES:
Daniel E Daly.
Victor C. Lynch.
INVENTOR
Perry R. Duncan
BY Lynch & Dorer
ATTORNEYS

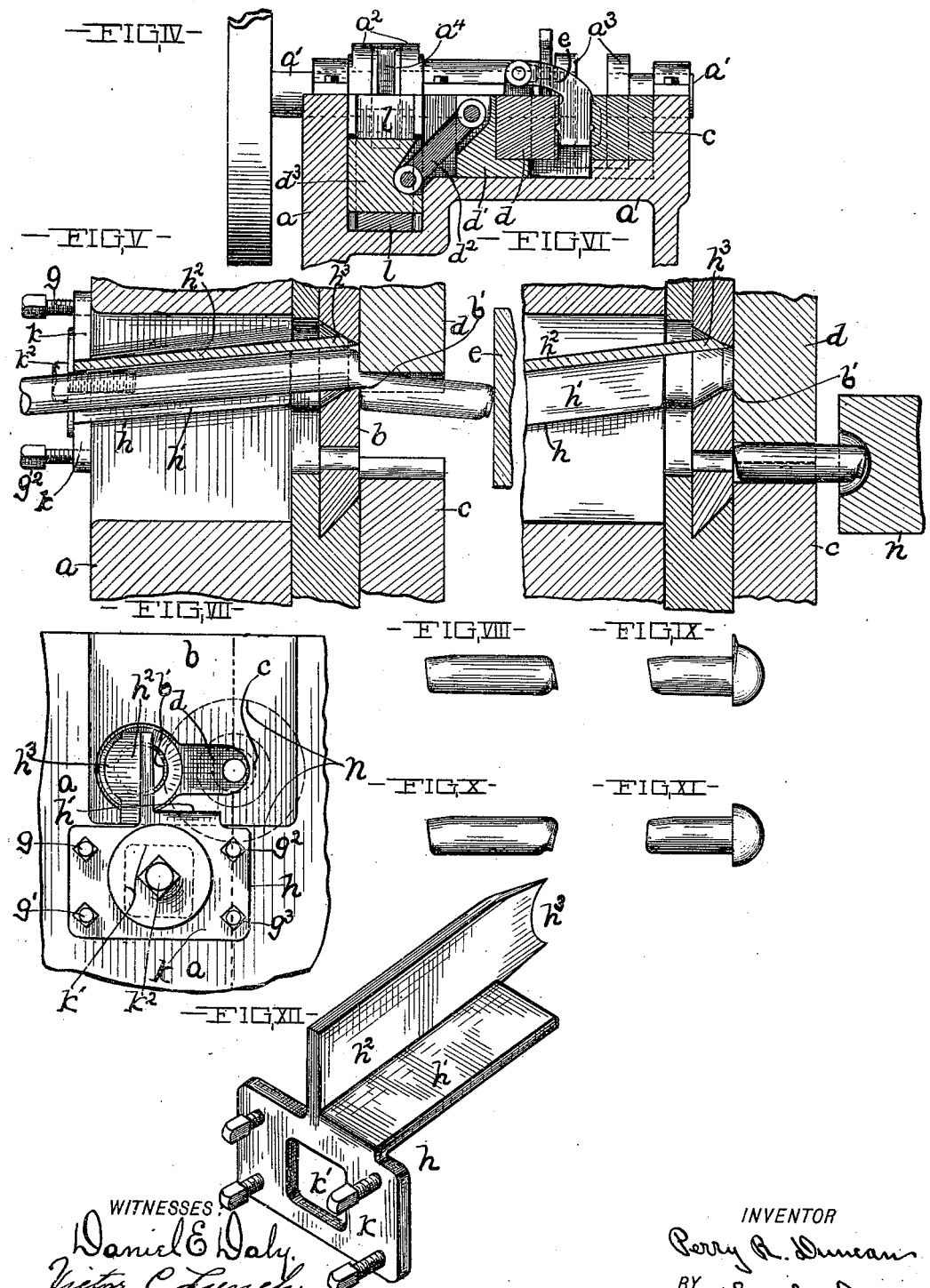

UNITED STATES PATENT OFFICE.

PERRY R. DUNCAN, OF CLEVELAND, OHIO, ASSIGNOR OF ONE-HALF TO DAN J. CAHILL, OF SAME PLACE.

MECHANISM FOR MANUFACTURING RIVETS.

SPECIFICATION forming part of Letters Patent No. 658,836, dated October 2, 1900.

Application filed May 11, 1900. Serial No. 16,327. (No model.)

*To all whom it may concern:*

Be it known that I, PERRY R. DUNCAN, a resident of Cleveland, in the county of Cuyahoga and State of Ohio, have invented certain new and useful Improvements in Mechanism for Manufacturing Rivets; and I do hereby declare the following to be a full, clear, and exact description of the invention, such as will enable others skilled in the art to which it pertains to make and use the same.

My invention relates to improvements in machines for heading rivets, bolts, and the like.

The object of my invention is to provide means, in combination with a heading-machine of the character hereinafter set forth, for producing a rivet or bolt having a perfectly-formed head.

Heretofore the principal difficulty met with in the manufacture of rivets or bolts has been to produce a rivet or bolt having a perfect or symmetrical head for the reason that during the operation of striking the head an excess of metal is caused to "flow" to one side, forming a projecting flange around the bottom edge of the head at that side, commonly termed the "flash." By long experience in the manufacture of bolts I have discovered that the defect in the formation of the bolt-head is owing to the peculiar compression and distortion of the end of the bolt-blank during the shearing operation. After repeated experiments I have also discovered that by feeding the bolt-bar to the shear at an obtuse angle to the moving die I am able to correct this defect and obtain a rivet or bolt blank the end of which is adapted to form a perfect head.

My invention therefore consists in providing, in combination with a machine of the character set forth, means for guiding and controlling the direction of the bar while being fed to the machine, so as to cause it to enter the shear at an obtuse angle to the movable die and maintain the same position while the blank is being sheared therefrom.

My invention further consists of the peculiar construction hereinafter described in the specification, illustrated in the drawings, and pointed out in the claims.

The operation of machines of the class to which my invention pertains is generally as follows: The bar from which the rivets or bolts are to be cut is heated and fed through the bore of the shear-plate until it comes in contact with the stock-gage, which determines the length of the bolt. Behind the shear-plate are located a movable die and a stationary die. When the machine is operated, the movable die passes across the inner face of the shear-plate, carrying the bar against the edge of the shear and severing the bolt-blank by the continued pressure on the end of the bar. The movable die continues to travel across the shear-plate, carrying the bolt-blank away from the shear-hole and clamping it firmly against the face of the stationary die. The stock-gage is then raised, and a head is formed on the blank by means of a heading-die driven by a reciprocating plunger.

Referring to the drawings, Figure I is a plan of a machine to which my improvement is applicable. Fig. II is a section on lines II II, Fig. I. Fig. III is a section on lines III III, Fig. I. Fig. IV is a section on lines IV IV, Fig. I. Fig. V is a detail sectional view showing a bolt-blank being sheared from the bar. Fig. VI is a detail sectional view showing a bolt-blank in position to be headed. Fig. VII is a detail view in elevation showing my device applied to a machine. Fig. VIII is a blank produced by the old process. Fig. IX shows a bolt-head with flash as formed by old process. Fig. X shows a blank formed by the use of my improved device. Fig. XI shows the completed rivet as produced by my improved method. Fig. XII is a perspective view of my improved device detached from machine.

Referring to the drawings, $a$ represents the frame of the machine.

$a'$ represents the main driving-shaft. This shaft carries two cranks $a^2$ and $a^3$. The crank $a^2$ is operatively connected to the toggle-slide $l$ by means of a pitman $a^4$.

$b$ represents the shear-plate. This plate has a circular opening or bore, the edge $b'$ of which is beveled to form the blade of the shear.

Immediately behind the shear-plate are located two dies $c$ and $d$. The die $c$ is rigidly secured in the frame. The die $d$ is secured to a sliding block $d'$, which is in turn connected to a toggle-block $d^3$ by means of a toggle $d^2$. The toggle-block $d^3$ is adapted to slide vertically in the frame $a$. When the toggle-block is at its lowest point, the die $d$ is farthest removed from the die $c$. When the machine is operated, the toggle-slide $l$ is driven under the toggle-block $d^3$, raising it, which in turn advances the die-block, carrying the die $d$ across the inner face of the shear-plate and into contact with the die $c$.

$e$ represents the stock-gage, which is mounted so as to be moved out of its position on the advance of the heading-die $n$, driven by the plunger $f$, connected to the crank $a^3$ by the pitman $a^5$.

When the bar from which the blank is to be cut is fed to the shear, the pressure of the moving die forces the end of the bar against the shear-blade, causing the bar to swing around and assume a position at an acute angle to the direction in which the die is moving. The continued forward pressure of the moving die on one side of the bar and the resistance of the shear on the other side distort the end of the bar, effecting a compression on the side nearest the moving die and causing a depression on the opposite side and drawing the edge thereof upward, forming a "beak," as shown in Fig. VIII of the drawings. When the heading-die is forced down upon the bolt-blank, the beak travels to the central or deepest portion of the heading-die. The material contained in the beak is caused to flow toward the side of the bolt-blank, which is already compressed to a certain extent, causing an excess of material at that side, which produces the flash. By my invention I provide a device located in proximity to the shear-plate and adapted to form a guide for directing the course of the bar, so that it will enter the shear at an obtuse angle to the direction in which the die is moving and also constitute a stop to prevent the bar from swinging to an acute angle with the moving die while being sheared. My preferred construction comprises a guideway $h$, adapted to enter the shear-hole in the shear-plate and project outwardly therefrom at an obtuse angle to the direction in which the die moves while the bar is being sheared. The inner end of the guideway is adapted to abut against the shear-blade at a point opposite the side against which the bar is forced while being sheared. This guideway $h$ consists of a horizontal bottom portion $h'$ and a vertical side portion $h^2$. The side portion $h^2$ is longer than the bottom portion, and the projecting end $h^3$ thereof is reduced in size and beveled, so as to fit into the hole in the shear-plate. This guideway is rigidly secured at its outer end to a support $k$, so as to form an obtuse angle therewith. This support comprises a plate which is adapted to be rigidly secured to the frame of the machine. This plate is provided with an opening $k'$ to allow the passage of a bolt $k^2$ for securing the plate to the frame of the machine. The opening $k$ is considerably larger than the stem of the bolt $k^2$, which allows the plate to have a slight vertical and horizontal adjustment on loosening the said bolt. Thumb-screws $g$, $g'$, $g^2$, and $g^3$ are provided in the plate for adjusting the distance of the end of the guiding device from the blade of the shear.

The operation of the machine with my improvement is as follows: My device is first adjusted on the frame of the machine, so that the end or nose thereof extends into the shear-hole. The remainder of the guideway extends outwardly at an obtuse angle to the direction in which the die moves during the shearing operation. The end of the bar is placed in the guideway, and is thus directed through the shear-hole at an obtuse angle to the moving die. When the moving die comes in contact with the inner end of the bar, the first effect would be to swing the bar around and cause it to assume an acute angle to the direction in which the die is moving; but this is prevented by the side $h^2$ of the guideway. The bar is therefore sheared while maintaining its position at an obtuse angle to the moving die. The result is that the end of the bar, which becomes the head end of the blank, is distorted in a much less degree, and the shape thereof is exactly opposite to that produced by a machine without my improvement. The side nearest the moving die is compressed, and a depression is formed in the side touching the shear-blade. The end surface is caused to slope downwardly to the side having the depression, as shown in Fig. X. When the heading-die is forced down upon the blank, the edge of the blank at the compressed side, being highest, travels to the central or deepest portion of the heading-die. When the head is struck, any excess of material at this side is caused to flow toward the side having the depression, and a perfect and symmetrical head is formed on the bolt.

I have illustrated and particularly described the form in which I think my improvement can best be applied to machines of the character set forth, for when embodied in this form of construction it can be easily applied to old machines, readily adjusted thereon, and replaced without much expense when worn out or broken. However, it will readily be seen that the particular form of construction may be varied without departing from the principle of my invention. The shear-plate, for instance, may be made thicker and the shear-hole bored therein at an obtuse angle to the direction in which the movable die travels during the shearing operation, or a bushing may be arranged in the shear-hole, so as to cause the bar on entering the hole to assume a position at an obtuse angle to the direction in which the movable die travels during the shearing operation.

What I claim is—

1. In a machine for heading bolts, rivets and the like, wherein the blank to be headed is sheared from a continuous bar, a blank holding and gripping device consisting of a stationary die and a movable die, a shear located in front of said gripping device and in such relation thereto that the blank will be sheared by the passage of the movable die across the inner face of the shear-carrying plate, and a guideway extending outwardly from the outer face of the said shear-carrying plate at an obtuse angle to the direction in which the movable die travels during the shearing operation, said guideway comprising a horizontal bottom portion and a vertical side portion, the said side portion extending beyond the bottom portion at the inner end of said guideway forming a nose adapted to enter the shear-hole in the shear-plate, substantially as described and for the purpose set forth.

2. In a machine for heading bolts, rivets and the like, wherein the blank to be headed is sheared from a continuous bar, a blank holding and gripping device consisting of a stationary die and a movable die, a shear located in front of said gripping device and in such relation thereto that the blank will be sheared by the passage of the movable die across the inner face of the shear-carrying plate, a guideway, extending outwardly from the outer face of the said shear-carrying plate at an obtuse angle to the direction in which the movable die travels during the shearing operation, comprising a horizontal bottom portion and a vertical side portion, said side portion extending beyond the bottom portion at the inner end of the guideway, a supporting-plate rigidly connected to said guideway at its outer end and means for adjustably securing the said plate to the frame of the said machine, substantially as described and for the purpose set forth.

3. In a machine for heading bolts, rivets, and the like, wherein the blank to be headed is sheared from a continuous bar, a blank holding and gripping device consisting of a stationary die and a movable die, a shear located in front of said gripping device, said shear consisting of a plate having an opening formed therein of sufficient size to permit the passage of the said bar therethrough, the plate around said opening being beveled outwardly to form the shear-blade, and a guideway located in proximity to and extending outwardly from the face of the said plate at an obtuse angle to the direction in which the movable die travels during the shearing operation, the said guideway having a beveled end adapted to abut against the bevel on the shear-plate, substantially as described and for the purpose set forth.

4. In a machine for heading bolts, rivets and the like, wherein the blank to be headed is sheared from a continuous bar, a blank holding and gripping device consisting of a stationary die and a movable die, a shear located in front of said gripping device, a face-plate located in front of said shear, said face-plate having an opening formed therein of sufficient size to allow the bar to be sheared to pass therethrough, the edges of the plate around said opening being beveled toward the outer face of the plate, and a guideway located in front of said plate having its inner end fitting into the opening in said plate and abutting against the beveled edge around the said opening, the body of the said guideway extending outwardly from the said face-plate at an obtuse angle to the direction in which the movable die travels during the shearing operation, substantially as described and for the purpose set forth.

Signed by me, at Cleveland, Ohio, this 28th day of April, 1900.

PERRY R. DUNCAN.

Witnesses:
VICTOR C. LYNCH,
A. H. PARRATT.